(No Model.)

C. L. BEERS.
CUSPIDOR.

No. 448,111. Patented Mar. 10, 1891.

WITNESSES:
Fred G. Dieterich
Jos. A. Ryan

INVENTOR:
Charles L. Beers,
BY Munn & Co.
ATTORNEYS

UNITED STATES PATENT OFFICE.

CHARLES L. BEERS, OF SCRANTON, PENNSYLVANIA.

CUSPIDOR.

SPECIFICATION forming part of Letters Patent No. 448,111, dated March 10, 1891.

Application filed October 25, 1890. Serial No. 369,292. (No model.)

*To all whom it may concern:*

Be it known that I, CHARLES L. BEERS, residing at Scranton, in the county of Lackawanna and State of Pennsylvania, have invented certain new and useful Improvements in Cuspidors, of which the following is a specification.

My invention has for its object to provide a cuspidor more especially adapted for use in public places, such as hotels, office-buildings, and the like, which is connected with the city water-supply and sewerage, and which can be quickly emptied and at the same time cleansed, such operation being accomplished by foot or hand pressure upon a button or knob.

To this end my invention consists of a hollow standard or bowl in which is journaled a reversible bowl or cuspidor proper, a source of water-supply, a discharge-outlet, said water-supply having a valved member extended within the hollow standard, and operating devices connected with the reversible bowl and the valved water-supply pipe, whereby, when such devices are operated to dump the bowl, the water will be turned on against the inverted bowl and serve to effectually cleanse it and the supporting bowl or standard of its contents.

My invention further consists in the peculiar combination and novel arrangement of the several parts, all of which will hereinafter be fully described in the annexed specification, and particularly pointed out in the claims, reference being had to the accompanying drawings, in which—

Figure 1:
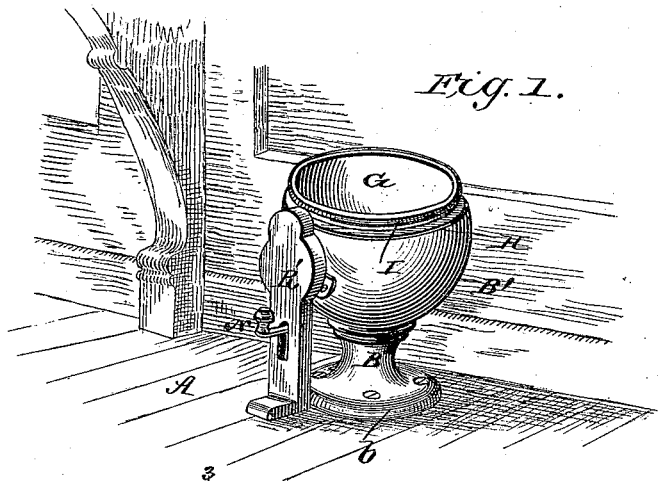
Figure 2:
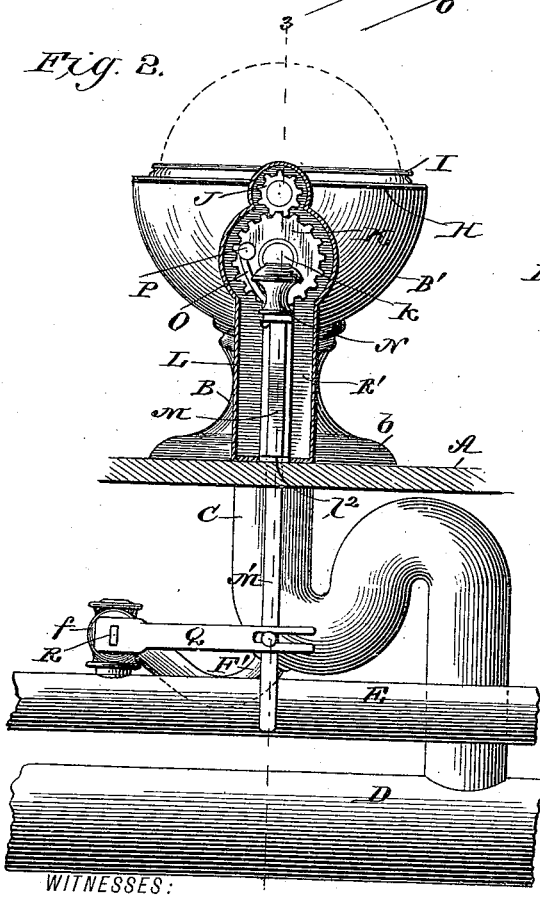
Figure 3:
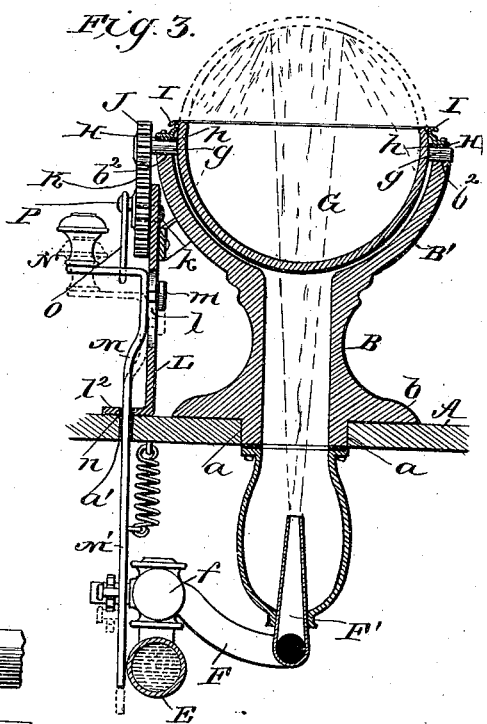

Figure 1 is a perspective view of my improved cuspidor. Fig. 2 is a sectional side elevation of the same; and Fig. 3 is a vertical section thereof, taken on the line 3 3, Fig. 2.

In the accompanying drawings, A indicates the floor, in which an aperture $a$ is formed, above which is disposed a hollow standard B, formed with an enlarged circular base $b$ and an enlarged semi-spherical bowl B', opening into the hollow standard, as shown. The lower end of the standard B is connected with a discharge-pipe C, formed with an S-trap connected with a waste-pipe D, which in practice is connected with the sewerage.

E indicates the water-supply pipe, and F a branch pipe connected therewith, provided with a valve $f$, said pipe being extended, as at F', such extension passing up through the pipe C into the hollow standard B, said pipe ending just below the upper end of the pipe C, as shown, the end of said pipe being preferably slightly contracted, so as to force the stream centrally upward.

G indicates the cuspidor-bowl proper, semi-spherical in shape, which is journaled in the upper edge of the bowl B' upon short stub-axles $g$ $g$, held in the bearings $b^2$ $b^2$ in the upper rim of the bowl B', as shown. By reference to Fig. 2 of the drawings it will be seen that the upper edge of the bowl G extends a short distance above the bowl B', and to form a tight joint between such bowls, and yet permit of the pivoted bowl being rotated, I provide an annular rubber ring H, which projects inward, as at $h$, against the inner bowl, such ring or washer being held in place by a metallic angle-ring I. One of the stub-journals $g$ is extended and formed with a pinion J, which meshes with a cog-wheel K, journaled on a stud $k$ on a vertical casting L, secured at its lower end to the floor and with its upper end to the bowl B, said casting being formed with a vertical slot $l$, in which travels a headed stud $m$, connected to a slide-bolt M, formed with a finger or foot piece N on its upper end, its lower end M' being extended and passed through an aperture $n$ in the foot $l^2$ of the casting and a hole $a'$ in the floor. The upper end of the bolt M is connected by means of a rod O with a wrist-pin P on the gear J, while its lower end is connected by means of a pivoted bar or lever Q with the valve-stem R of the valve $f$ in the branch pipe F'.

R' indicates a metallic casing, which incases the gear-operating mechanism, as clearly shown in Fig. 1 of the drawings.

From the foregoing description, taken in connection with the drawings, it will readily be seen that I provide a permanent cuspidor, which can at any time be cleansed by simply pressing down on the knob N, which through the gear mechanism will cause the cuspidor-bowl proper to turn upon its axis until it is inverted to the position shown in dotted lines, Fig. 3. The same movement of the knob will, through the bar and the intermediate connection between it and the valve in the water-supply pipe F', open such valve and allow the water to gush up against the inverted bowl, thoroughly cleansing the same. The water at the same time being deflected by the inverted bowl will splash back against the lower bowl B and cleanse it.

I desire to state that in practice I shall arrange the operation of the gears and the valve-opener such that the bowl will be inverted just in advance of the opening of the valve $f$, so as to prevent the possibility of any of the water passing up past the bowl. It will be also understood that the packing-ring and rim before described will serve to prevent any water passing up after the bowl has been completely turned over. Any suitably-arranged spring may be employed to bring the bowl back to its normal position when pressure is released from the knob; or it might be made slightly heavier on one side, so as to fall back by gravity.

I desire it understood I do not limit myself to the exact construction shown for turning the bowl and turning on the water, as this may be varied in many ways without departing from the broad idea of my invention.

By arranging a cuspidor in the manner described and cleansing it with a city water-supply the water when turned on will be of a force sufficient to effectually remove and carry off the larger particles of filth in the cuspidors, such as cigar stumps, tobacco, paper, &c., thus avoiding the necessity of cleaning out such cuspidor by hand.

Having thus described my invention, what I claim, and desire to secure by Letters Patent, is—

1. An improved cuspidor consisting of a reversible bowl, a discharge-trough arranged to receive the contents of such bowl when reversed, a source of water-supply adapted to wash against the bowl when inverted, and devices intermediate the bowl and water-supply arranged to operate for reversing said bowl and turning on the water-supply, substantially as and for the purpose described.

2. An improved cuspidor consisting of a hollow standard and outlet-pipe, a bowl journaled in the hollow standard for reversible movement and adapted to empty its contents in the standard when reversed, and a source of water-supply cut off when the bowl is in its normal position and opened to wash against the inner face of the bowl when turned over to empty its contents, as stated, substantially as shown and described.

3. In an improved cuspidor, the combination, substantially as described, of a hollow standard formed with a semi-spherical bowl at its top, a second bowl journaled therein and arranged for a semi-rotation, a waste-outlet connected with the hollow standard, a source of water-supply opening into the said standard, and devices intermediate the second bowl and the water-supply arranged to turn the said second bowl and turn on the water-supply and automatically bring the second bowl back to its normal position and cut off the water, substantially as and for the purpose described.

4. The combination, with the hollow standard B and a discharge-outlet connected therewith, and source of water-supply arranged to throw water from below against the bowl when inverted, of the bowl G, journaled in the bowl B, and a packing device secured to the upper rim of the hollow standard, adapted to bear against the bowl G and prevent water being passed out between the bowl and the hollow standard, substantially as and for the purpose stated.

5. The combination, with the reversible bowl G, the standard or support for the same, a discharge-outlet connected with said standard, and a valved water-supply pipe extended within the hollow standard, of the vertically-movable operating-bar connected at its upper end with the reversible bowl C and at its lower end with the valve $f$ of the water-supply pipe and arranged when depressed to rotate the bowl G and turn on the valve $f$, and means for bringing such valve and bowl to their normal position, substantially as and for the purpose described.

6. The combination, with a hollow standard formed with a discharge-pipe at its lower end and a fixed bowl B' at its upper end, of the reversible bowl G, journaled in said bowl B' and arranged to fit same snugly, as shown, whereby said bowl when reversed will close the upper end of the bowl B', and a water-supply arranged to wash the inverted bowl G and bowl B' when said bowl G is reversed, substantially as and for the purpose described.

7. The combination of the hollow standard B, formed with a bowl B' and a discharge-pipe connected therewith, a source of water-supply extended up into said standard, a bowl G, hung for reversible movement in the bowl B, a valve $f$ in the water-supply, and a spring-actuated depressing-bar, said bar connected with the bowl G and the valve $f$ and arranged when depressed to dump the bowl G and turn on the water-supply, substantially as and for the purpose described.

CHARLES L. BEERS.

Witnesses:
FRED G. DIETERICH,
SOLON C. KEMON.